Patented Oct. 6, 1931

1,825,935

UNITED STATES PATENT OFFICE

JAMES ELIOT BOOGE, OF WILMINGTON, DELAWARE, ASSIGNOR TO E. I. DU PONT DE NEMOURS AND COMPANY, OF WILMINGTON, DELAWARE, A CORPORATION OF DELAWARE

LIQUID COATING COMPOSITION AND PROCESS OF MAKING SAME

No Drawing. Application filed November 20, 1925. Serial No. 70,221.

This invention relates to a new protective coating composition comprising essentially nitrocellulose and a blown (or partly oxidized) drying oil, a solvent or thinner also usually being present; and to a process of making such a composition. My new composition comprises more particularly the combination of nitrocellulose having an abnormally low viscosity, with a drying oil which has been blown, while hot, with air until it becomes capable of forming with the low viscosity nitrocellulose a stable homogeneous mixture—that is, a mixture from which the oil will not separate or segregate on standing.

In a copending application I have described and claimed a process of incorporating a drying oil with nitrocellulose to form a stable homogeneous mixture, by first subjecting the oil to limited oxidation by blowing the hot oil with air or other oxygen containing gas. I have now discovered that a process of this kind may be used, especially in conjunction with low viscosity nitrocellulose, to produce a protective coating composition having a combination of superior properties which has not, so far as I am aware, been possessed by any single coating composition of the prior art. For instance, my new composition dries very quickly to an initial set up sufficiently hard to allow immediate handling or wear, and gradually becomes further hardened through progressive oxidation of the oil, such further oxidation being promoted ordinarily by the presence of a drier.

The reason for the blown drying oil being more compatible with nitrocellulose than the unblown oil is not as yet clearly understood. Chemical analyses of the reaction products seem to indicate the initial formation of a peroxide of the oil; if the peroxide is in fact formed, its transformation into an alpha-hydroxy-ketone by spontaneous intramolecular rearrangement would afford the most probable explanation of the high solvent or colloiding power for nitrocellulose possessed by the blown drying oil.

There is, apparently, reason for believing that the chemical change in a drying oil caused by blowing the oil with air at an elevated temperature, is substantially different from the chemical action caused by the air when a film of drying oil, containing a drier distributed therethrough, is allowed to dry or harden in contact with said air. The drier, which is not present during the regular blowing operation, evidently changes the mechanism of the reaction, perhaps causing the formation of different oxidation products, and promoting a different type of condensation or polymerization, then result when the oil is treated with air at a high temperature in the absence of a drier.

My new protective coating composition may be used either as a clear coating like ordinary varnish, or as an enamel or paint, or in general for any of the present applications for paints, varnishes or lacquers.

The present varnish formulas have several serious disadvantages which have heretofore been accepted as being necessary evils due to the non-availability of better protective coatings. These disadvantages include (1) slow drying, requiring from 12 to 24 hours, or even longer, between coats or before the coating material may be used following the final application, (2) softness of film, allowing easy scratching or printing in warm, humid weather, etc., (3) short life of film, especially where the formulation is directed toward a hard film and quick drying. In formulas of the usual type a hard film and even moderately rapid drying are obtained only by the use of short-oil compositions, that is, compositions containing a large proportion of varnish resins. These varnish resins are known to induce an accelerated disintegration of the film, which is indicated by chalking, wearing away, checking and cracking, etc. The result has been, therefore, that, with the type of varnish composition heretofore used, it has not been possible to produce a really durable protective coating which is at the same time hard and quick drying.

In my process these disadvantages are overcome by the introduction of nitrocellulose, and preferably a low-viscosity nitrocellulose, as a hardening ingredient in place of the fossil and synthetic resins which have been used in the art. Heretofore, however, it has not been possible to use nitrocellulose for this purpose due to its incompatibility with ordinary paint and varnish materials. In my process this incompatibility is overcome by the use of blown oil as will be discussed later in more detail. When a varnish or paint composition is made with nitrocellulose as the hardening ingredient, the disadvantages cited in the previous paragraph are avoided to a large extent, and the following important advantages are realized: (1) The films dry in less than one hour and often in 15 minutes, depending upon the volatility of the solvent. The next coat may then be applied immediately. (2) The hardness is excellent. As soon as the solvent has evaporated the film can be handled without marring, and from then on it progressively hardens, presumably due to the oxidation of the oil. Also by variation in the proportion of nitrocellulose to oil the hardness can be varied at will. With more nitrocellulose the hardness increases. (3) Nitrocellulose as a hardening ingredient differs from the usual varnish resins in that it does not induce disintegration of the oil film even when relatively large amounts of nitrocellulose are present. Hence, short oil, very hard compositions of the type cited below possess a life comparable with that of very long oil varnishes of the spar and automobile finishing type, which in turn are very slow drying and not nearly so hard. It may be added that the adhesion, toughness and elasticity of film, which are advantages of the oil type of varnish films, have been retained in my compositions.

To summarize, my new composition makes possible a combination of the very desirable rapid hard drying, together with elasticity and toughness of film, good adhesion, and great durability not heretofore possible in the art. The revolutionary improvement effected will be evident from a comparison with a high grade spar varnish.

| Material | Time to dry hard | Relative hardness after 24 hours | Adhesion | Life on roof |
|---|---|---|---|---|
| Spar varnish (about 40 gal. oil length). | 15 hrs | 9—Fairly hard | Good | Checks in 4 mos. |
| New composition (20 gal. oil length). | 30 min | 5—Very hard | Good | Does not fail in 9 mos. |

In preparing the oil for use in my new composition, I may start with linseed, Chinawood, perilla or other drying oils. This oil is heated to a suitable temperature and is blown with air, the latter being forced up through the oil, preferably in fine bubbles. There results a drop in the iodine number of the oil (preferably from 180 to 130 for linseed oil, and from 170 to 130 for Chinawood oil) accompanied by an increase in viscosity or body. The rate of reaction depends on the temperature and amount of air supplied. For some applications a low temperature blown oil is best; for others, the temperature is allowed to rise and hasten the operation; in general, the temperature for this blowing operation will range from 60° to 125° C. The linseed oil used in the formulas described below was blown at about 100° C. for some 4 hours. The air was regulated to produce a body of about twice that of castor oil, or about 1300 centipoises at 25° C., this viscosity having been determined by the method described in Jour. Ind. & Eng. Chem., 1922, p. 1164. The iodine number of the blown oil should preferably be approximately 135.

The nitrocellulose as stated above is preferably a low viscosity type, such as is now used in enamels for automobile finishes. For example, the viscosity of a 16-oz. ethyl acetate solution of the nitrocellulose (that is, 16 oz. of nitrocellulose dissolved in one gallon of solvent) may run from about 20 centipoises to about 280 centipoises at 25° C.

The solvent mixture may be varied widely, but in general there should be sufficient active nitrocellulose solvents present to yield a clear, strong film. The necessary proportions of ethyl acetate, butyl acetate, ethyl alcohol, butyl alcohol, aromatic hydrocarbons as benzene, toluene, "solvent naphtha", etc., are well known in the art. As examples, satisfactory formulas are given below containing practical solvent mixtures. The proportions of blown oil to nitrocellulose can be varied widely without sacrifice in rapid drying. Usually I employ from 5 gals. to 80 gals. of blown oil (approximately 40 to 640 lbs.) per 100 lbs. of nitrocellulose.

*Example I—5 gal. oil composition*

| | Parts |
|---|---|
| Nitrocellulose | 100 |
| Oil | 40 |
| Solvent (approx.) | 500 |

*Example II—Medium oil composition (20 gals.)*

| | Parts |
|---|---|
| Nitrocellulose | 100 |
| Oil | 160 |
| Solvent (approximately) | 500 |

*Example III—Long oil composition (40 gals)*

| | Parts |
|---|---|
| Nitrocellulose | 100 |
| Oil | 320 |
| Solvent (approximately) | 500 |

The solvent used in the above examples may be a mixture having the following composition:

| | Per cent |
|---|---|
| Ethyl acetate | 16½ |
| Butyl acetate | 33½ |
| Ethyl alcohol (95%) | 5 |
| Butyl alcohol | 7 |
| Fusel oil | 3 |
| Toluene | 15 |
| Xylene | 20 |
| | 100 |

Blown China-wood oil gives similar results, although the films are slightly harder than those from the blown linseed oil. Where the property of elasticity is very desirable, blown linseed oil is advantageous. Formulas similar to the above will serve well with substitution of blown China-wood oil for blown linseed oil. A similar discussion applies to the other blown drying oils, such as perilla, and semi-drying oils, such as soya bean. Perilla oil imparts qualities between those of wood oil and linseed. Soya bean oil gives softer films, drying to the final hard stage much more slowly. Its use is limited to the lower ratios of oil to nitrocellulose except in cases where very elastic films are desired with sacrifice in hardness. In some cases I prefer to use mixtures of blown oils—for example, blown China-wood and linseed oils—where properties are desired falling between those imparted by the individual oils. Whether made from a single drying oil or from a combination of oils, the films obtained in accordance with my invention are characterized by the fact that they are practically non-thermoplastic—that is, they will not soften or melt when heated.

It is to be noted that although blowing the drying oil in accordance with my invention imparts thereto the property of compatibility with nitrocellulose, the blown oil remains a drying oil in that a thin layer thereof, when exposed to air in the presence of a drier, changes to a hard, flexible film.

The oils in my compositions may be used either with or without a drier. Where presence of a drier, for example cobalt linoleate, is desired, the proportion of cobalt linoleate used is preferably such that the weight of cobalt therein equals 0.1% or less of the weight of drying oil present.

If enamels or paints are to be made up with my new composition as a vehicle, the pigments are merely ground in by known means, such as buhrstone or pebble mills. If the ratio of pigment to oil is too great, or if the body of the oil is too high, some solvent or thinner may be added. In the latter case, it may be desirable to use closed mills to avoid evaporation. Likewise, in some cases the pigments may be ground in the entire vehicle formula (with or without all the thinner) in closed mills. It will, of course, be understood that other methods familiar in the art may be used for incorporation of the pigments. The above methods are merely given as examples.

The clear coats and pigmented coats referred to above may be applied by flowing, dipping, tumbling, or other means known in the art. (Different viscosities or bodies are required for different methods of application. These may be obtained by suitable regulation of the amount of the solvent mixture given in the formulas.) However, spraying is the usual procedure, due to the ease and rapidity of manipulation. The formulas given above are not well adapted for brushing.

I am familiar with attempts in the prior art to incorporate oils and nitrocellulose in the same composition. For example, U. S. Patent No. 1,295,533, pertaining to plastic compositions, claims combinations of a drying oil and nitrocellulose. However, this process is operative only if the proportion of oil to nitrocellulose is so small that the oil acts only as a softener for the nitrocellulose film. If attempts is made to increase the ratio of drying oil as in my compositions, it is found that the two materials are incompatible and separation occurs either on standing or on evaporation of the solvent. Although compositions such as described in the above patent may be useful in the production of plastics they are useless as protective coatings since they lack adhesion and durability. If the oil content of the mixture is increased with the object of making the oil a film-forming ingredient, then precipitation occurs and the film is ruined. Even if the oil content is limited as indicated in the specification, the film will be much softer and slower in drying at ordinary temperatures than compositions such as I use. This difference is due to the fact that the blowing treatment which I have developed leads very definitely to compatibility between the oil and nitrocellulose, which enables me to use relatively large proportions of oil to nitrocellulose, thus giving quick drying, homogeneous, uniform protective films of a high degree of toughness, harness, durability and adhesion.

I am also familiar with the employment of blown non-drying oils in such products as plastics and artificial leather; for example, my own U. S. Patent No. 1,412,770 covers blown rapeseed or cottonseed oil-nitrocellulose mixtures. In the prior art, however, the blown oil was used merely as a nitrocellulose softener to modify the film from the latter, and was usually added in relatively small proportions. My present composition is entirely different in type and behavior. The blown drying oil, instead of acting as an inert softener, decreasing the hardness and strength inherent in the nitrocellulose constituent of the mixture, rather adds greatly to the film properties; in fact, in the higher ratios of oil to nitrocellulose, the blown oil is seemingly the chief film-forming ingredient, the nitrocellulose merely acting as a hardening agent. This is, of course, not possible with a non-drying blown oil in combination with nitrocellulose, which composition I do not wish to cover. As already pointed out, films of practical usefulness are not obtainable with these higher oil ratios from either untreated drying oils on the one hand, or blown non-drying oils on the other.

Although my invention has been described in considerable detail, and illustrated by certain specific embodiments thereof, it will be understood that the scope of my invention is not to be limited to the said specific embodiments or details. In general, the nitrocellulose which I prefer to use should have a viscosity substantially less than that which is characteristic of normal solution pyroxylins; and the drying oil used should have an iodine number substantially less than 160, and a viscosity greater than 1000 centipoises at 25° C., in order to be miscible or compatible with nitrocellulose. As I have previously indicated, I prefer to containue the oxidation or blowing until the iodine number is reduced to between 125 and 140, and the viscosity in the case of linseed oil has been increased to about 1,300 centipoises at 25° C. The extent of the blowing or partial oxidation will, of course, vary somewhat, depending upon the particular oil and the particular nitrocellulose which are used.

The term drying oil in the claims is intended to cover such oils as linseed oil, Chinawood oil, perilla oil, soya bean oil and other oils having an iodine number above 120.

I claim:

1. The process of making a liquid coating composition which comprises blowing a drying oil with air until it becomes compatible with the desired proportion of nitrocellulose, and then mixing the thus treated oil with nitrocellulose and with a drier for the oil.

2. A process as set forth in claim 1 in which the blown oil is mixed with a drier and with a solution of nitrocellulose in a volatile solvent.

3. The process of making a liquid coating composition which comprises blowing a drying oil with an oxygen-containing gas until the iodine number of said oil attains a value of from about 130 to 140, and the viscosity thereof has substantially increased, and mixing the resulting blown oil with nitrocellulose.

4. A process as set forth in claim 3 in which more than 30 parts of blown oil is mixed with 100 parts of nitrocellulose.

5. A process as set forth in claim 3 in which from about 40 to 640 parts of blown oil is mixed with 100 parts of nitrocellulose.

6. The process of making a liquid coating composition which comprises mixing from about 40 to 640 parts of a blown drying oil having an iodine number of from 125 to 140 with 100 parts of nitrocellulose dissolved in a volatile solvent.

7. The process of making a liquid coating composition which comprises mixing a blown drying oil having an iodine number of from 130 to 140 and a viscosity of about 1300 centipoises at 25° C., with nitrocellulose dissolved in a volatile solvent.

8. A liquid coating composition comprising a mixture of from about 40 to 640 parts (by weight) of a straw-colored blown drying oil whose iodine number is between 125 and 140 with 100 parts of nitrocellulose.

9. A liquid coating composition comprising a mixture of from aboue 40 to 640 parts (by weight) of a straw-colored blown drying oil whose iodine number is between 125 and 140 with 100 parts of a nitrocellulose whose viscosity characteristic is such that the viscosity of a 16-oz. ethyl acetate solution thereof is less than 300 centipoises at 25° C.

10. A liquid coating composition comprising a mixture of from about 40 to 640 parts (by weight) of a straw-colored blown drying oil whose iodine number is between 125 and 140 with 100 parts of a nitrocellulose whose viscosity characteristic is such that the viscosity of a 16-oz. ethyl acetate solution thereof is between about 20 and 280 centipoises at 25° C.

11. A liquid coating composition comprising a mixture of a straw-colored blown drying oil whose iodine number is between 125 and 140 and nitrocellulose capable of forming a 16-oz. ethyl acetate solution whose viscosity is less than 300 centipoises at 25° C.

12. A liquid coating composition comprising a mixture of a blown drying oil whose iodine number is between 125 and 140, and nitrocellulose.

13. A liquid coating composition comprising a mixture of a blown drying oil whose iodine number is between 125 and 140, and nitrocellulose capable of forming a 16-oz. ethyl acetate solution whose viscosity is less than 300 centipoises at 25° C.

14. A liquid coating composition comprising a stable, uniform mixture of from about 40 to 640 parts of a blown drying oil whose iodine number is between 125 and 140, and 100 parts of nitrocellulose.

15. A liquid coating composition comprising a mixture of from about 40 to 320 parts of a blown drying oil whose iodine number is about 130, and 100 parts of nitrocellulose.

16. A liquid coating composition comprising a mixture of from about 40 to 320 parts of a blown drying oil whose iodine number is about 130, and 100 parts of a nitrocellulose capable of forming a 16-oz. ethyl acetate solution whose viscosity is between about 20 and 280 centipoises at 25° C.

17. A liquid coating composition comprising nitrocellulose and a drying oil whose iodine number is about 130 and whose viscosity is about 1300 centipoises at 25° C., said oil being obtainable by blowing a drying oil with air for about four hours at about 100° C.

18. A liquid coating composition comprising a mixture of nitrocellulose whose 16-oz. ethyl acetate solution has a viscosity of from about 20 to 280 centipoises at 25° C., and an air blown drying oil whose iodine number is substantially less than 160 but not below 125 and whose viscosity is greater than 1,000 centipoises at 25° C.

19. The process of making a liquid coating composition which comprises blowing an oil of the group which consists of linseed oil, China-wood oil, perilla oil, soya bean oil and a mixture of these oils with an oxygen-cantaining gas to substantially reduce the iodine number of said oil and substantially increase the viscosity thereof, and mixing the resulting blown oil with nitrocellulose.

In testimony whereof I affix my signature.

JAMES ELIOT BOOGE.